(12) United States Patent
Zhao

(10) Patent No.: US 12,035,312 B2
(45) Date of Patent: Jul. 9, 2024

(54) COMMUNICATION FEEDBACK METHOD, USER DEVICE, AND STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 530 days.

(21) Appl. No.: 17/418,742

(22) PCT Filed: Dec. 29, 2018

(86) PCT No.: PCT/CN2018/125828
§ 371 (c)(1),
(2) Date: Jun. 25, 2021

(87) PCT Pub. No.: WO2020/133507
PCT Pub. Date: Jul. 2, 2020

(65) Prior Publication Data
US 2022/0078778 A1    Mar. 10, 2022

(51) Int. Cl.
*H04W 72/20* (2023.01)
*H04L 1/1607* (2023.01)

(52) U.S. Cl.
CPC ........... *H04W 72/20* (2023.01); *H04L 1/1607* (2013.01)

(58) Field of Classification Search
None
See application file for complete search history.

(56) References Cited

U.S. PATENT DOCUMENTS

| 10,009,786 | B2* | 6/2018 | Seo | ............................ G01S 5/14 |
| 2018/0213438 | A1* | 7/2018 | Muraoka | ............ H04W 72/0446 |
| 2019/0052436 | A1* | 2/2019 | Desai | ................. H04W 72/0446 |
| 2019/0253198 | A1* | 8/2019 | Baldemair | ............. H04L 1/1854 |
| 2019/0288808 | A1* | 9/2019 | Baldemair | ............. H04W 72/21 |
| 2020/0112982 | A1* | 4/2020 | Li | ........................... H04W 76/14 |
| 2021/0160026 | A1* | 5/2021 | Wang | ................ H04W 72/0446 |

FOREIGN PATENT DOCUMENTS

CN    107534828 A    1/2018

OTHER PUBLICATIONS

PCT/CN2018/125828 English translation of the International Search Report dated Sep. 26, 2019, 2 pages.

* cited by examiner

*Primary Examiner* — Alpus Hsu
*Assistant Examiner* — Camquyen Thai
(74) *Attorney, Agent, or Firm* — Cozen O'Connor

(57) ABSTRACT

The disclosure relates to a communication feedback method. The communication feedback method includes: receiving first sidelink control information (SCI) sent by a sending end, the first SCI containing time indication information; determining estimated transmission time information of target data based on the time indication information; receiving the target data and second SCI associated with transmission of the target data based on the estimated transmission time information; and feeding back non-acknowledgment (NACK) information to the sending end in response to failing to receive the second SCI or failing to correctly receive the target data based on the estimated transmission time information.

20 Claims, 8 Drawing Sheets

COMMUNICATION FEEDBACK METHOD, USER DEVICE, AND STORAGE MEDIUM

CROSS-REFERENCE TO RELATED APPLICATION

This application is a U.S. national phase of International Application No. PCT/CN2018/125828, filed on Dec. 29, 2018, the entire content of which is incorporated herein by reference.

TECHNICAL FIELD

The present disclosure generally relates to the field of wireless communication technologies, and more particularly, to a communication feedback method, a user device, and a storage medium.

BACKGROUND

With the development of wireless communication technology, V2X (Vehicle To Everything) has evolved into C-V2X (Cellular-based V2X) based on cellular communication technology. In C-V2X, vehicle-mounted devices and other devices can communicate with each other through base station relay, or communicate directly through sidelink between devices. Compared with the mode of communicating through base station relay, the sidelink communication mode has the characteristics of short delay and low signaling cost, and is very suitable for the communication between vehicle-mounted devices and other peripheral devices. In addition, the sidelink communication mode also supports the multicast transmission mode and the HARQ (Hybrid Automatic Repeat Request) communication feedback mechanism of the multicast transmission mode. Other devices can perform communication feedback based on the HARQ communication feedback mechanism.

SUMMARY

According to embodiments of the present disclosure, it is provided a communication feedback method, including: receiving first sidelink control information (SCI) sent by a sending end, the first SCI containing time indication information; determining estimated transmission time information of target data based on the time indication information; receiving the target data and second SCI associated with transmission of the target data based on the estimated transmission time information; and feeding back non-acknowledgment (NACK) information to the sending end in response to failing to receive the second SCI or failing to correctly receive the target data based on the estimated transmission time information.

According to embodiments of the present disclosure, it is provided a communication feedback method, including: determining time indication information; sending first sidelink control information (SCI) to a receiving end, in which the first SCI indicates the time indication information, and the time indication information is configured to indicate target data to be transmitted and estimated transmission time information of second SCI associated with transmission of the target data; sending the target data and the second SCI to the receiving end; and retransmitting the target data in response to receiving non-acknowledgment (NACK) information fed back by the receiving end.

According to embodiments of the present disclosure, it is provided a user device, including a processor and a memory for storing instructions executable by the processor. The processor is configured to: receive first sidelink control information (SCI) sent by a sending end, the first SCI containing time indication information; determine estimated transmission time information of target data based on the time indication information; receive the target data and second SCI associated with transmission of the target data based on the estimated transmission time information; and feed back non-acknowledgment (NACK) information to the sending end in response to failing to receive the second SCI or failing to correctly receive the target data based on the estimated transmission time information.

According to embodiments of the present disclosure, it is provided a user device, including a processor and a memory for storing instructions executable by the processor. The processor is configured to: determine time indication information; send first sidelink control information (SCI) to a receiving end, in which the first SCI indicates the time indication information, and the time indication information is configured to indicate target data to be transmitted and estimated transmission time information of second SCI associated with transmission of the target data; send the target data and the second SCI to the receiving end; and retransmit the target data in response to receiving non-acknowledgment (NACK) information fed back by the receiving end.

According to embodiments of the present disclosure, it is provided a non-transitory computer-readable storage medium having stored therein instructions that, when executed by a processor of a user device, causes the user device to perform the communication feedback method of described in any of the first aspect.

According to embodiments of the present disclosure, it is provided a non-transitory computer-readable storage medium having stored therein instructions that, when executed by a processor of a user device, causes the user device to perform the communication feedback method of described in any of the second aspect.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

In order to achieve the objectives, technical solutions, and advantages of the present disclosure clearer, embodiments of the present disclosure will be further described in detail with reference to the accompanying drawings below.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
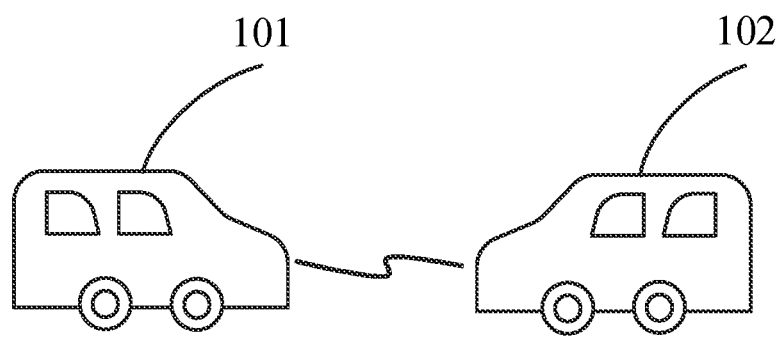
FIG. 1 is a schematic diagram showing a system architecture according to an embodiment of the present disclosure.

Embodiments of the present disclosure provide a system architecture of a communication feedback method. As illustrated in FIG. 1, the system architecture includes a sending end 101 and a receiving end 102. The sending end 101 and the receiving end 102 may communicate with each other through the sidelink. The system architecture may be a C-V2X (Cellular-based V2X) communication system.

The sending end 101 may be any device capable of sending data. For example, the sending end 101 may be a vehicle-mounted device, a handheld device, or a roadside device. The receiving end 102 may be any device capable of receiving data. For example, the receiving end 102 may be a vehicle-mounted device, a handheld device, or a roadside device. In some embodiments of the present disclosure, the sending end 101 and the receiving end 102 are not specifically limited.

The sending end 101 and the receiving end 102 may communicate with each other through the sidelink. The sidelink communication mode has the characteristics of short delay and low signaling cost, and is very suitable for the communication between the sending end 101 and the receiving end 102. In addition, the sidelink communication mode also supports the multicast transmission mode and the HARQ (Hybrid Automatic Repeat Request) communication feedback mechanism of the multicast transmission mode. The receiving end 102 may perform communication feedback based on the HARQ communication feedback mechanism.

In some embodiments of the present disclosure, the sending end 101 sends first SCI (Sidelink Control Information) to the receiving end 102. The first SCI includes time indication information. The receiving end 102 determines estimated transmission time information of target data according to the time indication information. The receiving end 102 receives the target data and second SCI associated with the transmission of the target data based on the estimated transmission time information, and feeds back NACK (Non-Acknowledgment) information based on a reception result. The target data are data that may arrive or be transmitted in the future. The time indication information may be time indication information of the next transmission adjacent to the current transmission, or it may be time indication information of a transmission that is not adjacent to the current transmission, there are n transmissions between the current transmission and the transmission not adjacent to the current transmission, where n is an integer ≥2.

When the receiving end 102 does not receive the second SCI, first NACK information is fed back. When the receiving end 102 receives the second SCI but does not receive the target data correctly, second NACK information is fed back. The sending end 101 determines that the receiving end 102 does not correctly receive the target data according to the first NACK information or the second NACK information fed back by the receiving end 102, and retransmits the target data to the receiving end 102.

The time indication information may be a first time interval between different transmissions, and correspondingly, the estimated transmission time information may be first estimated transmission time or a first estimated transmission time range. The time indication information may also be a second time interval and a third time interval between different transmissions, and correspondingly, the estimated transmission time information may be a second estimated transmission time range.

It should be noted that the application scenario may include multiple receiving ends 102, and the sending end 101 is connected with each receiving end 102 through C-V2X, so as to perform data transmission.

Figure 2:
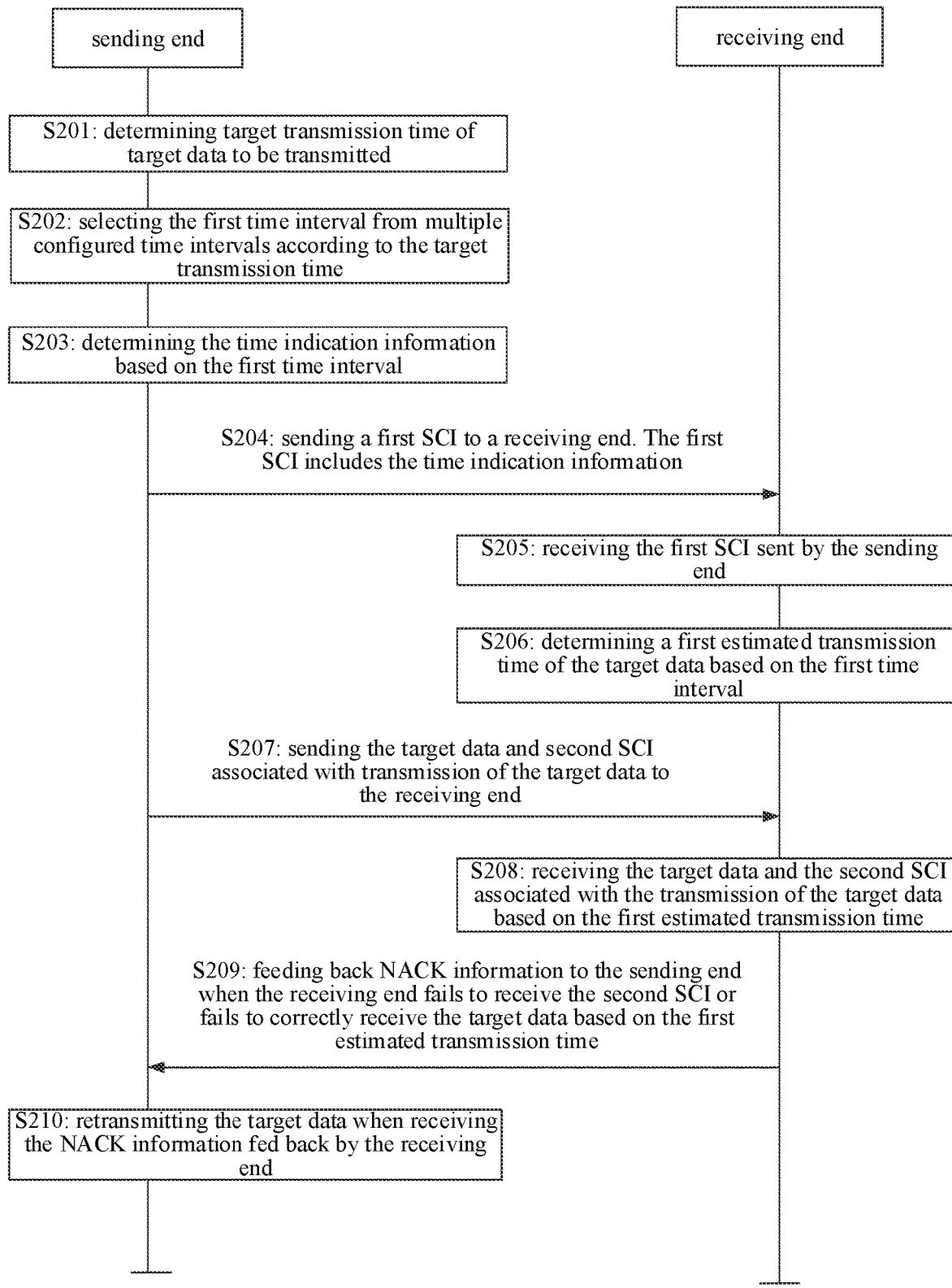
FIG. 2 is a flow chart showing a communication feedback method according to an embodiment of the present disclosure.

Embodiments of the present disclosure provide a communication feedback method. As illustrated in FIG. 2, for example, in this embodiment, the time indication information includes a first time interval between different transmissions, and the estimated transmission time information includes the first estimated transmission time, and the method includes the following.

At block S201, a sending end determines target transmission time of target data to be transmitted.

The sending end may predict future transmission time of the target data according to a time law of data arrival, application layer instructions, etc., and the predicted transmission time is taken as the target transmission time. For periodic services, the sending end may predict the target transmission time of the target data according to a periodic interval of the data arrivals.

At block S202, the sending end selects the first time interval from multiple configured time intervals according to the target transmission time.

The sending end may pre-configure multiple time intervals. The sending end may select the first time interval from the multiple configured time intervals according to estimated transmission time of transmitting first SCI and the future target transmission time of the target data determined at block S201. The action of selecting the first time interval by the sending end according to the target transmission time and the transmission time of the first SCI may be as follows. The sending end determines a transmission time difference between the estimated transmission time of transmitting the first SCI and the target transmission time, and then the sending end selects a time interval corresponding to the transmission time difference from the multiple time intervals according to the transmission time difference, and uses the time interval as the first time interval.

The sending end may also use a time interval between a current data transmission and a next data transmission as the first time interval according to a periodic interval of arrivals of periodic service data.

The multiple time intervals pre-configured by the sending end may be defined through a protocol, or may be configured by a base station. The base station may configure a time interval set for a user device through downlink cell-specific (for all users in a cell) or UE-specific (for a specific user) RRC (Radio Resource Control) signaling.

In some embodiments of the present disclosure, a time granularity of the first time interval is not specifically limited. For example, the first time interval may be 1 millisecond, 2 milliseconds, or 3 milliseconds. The unit of the time interval may be set and changed as required. In some embodiments of the present disclosure, the unit of the time interval is not specifically limited. For example, the unit of the time interval may be a time cell, a time domain symbol, a second or a millisecond, and so on.

At block S203, the sending end determines the time indication information based on the first time interval.

In this action, the first time interval is determined by the sending end and is added into the time indication information.

At block S204, the sending end sends first SCI to a receiving end. The first SCI includes the time indication information.

The sending end sends the first SCI before the target data arrives, and the time indication information included in the first SCI is the first time interval between the transmission time of the first SCI and the target data transmission time. The first SCI may be not associated with any data transmission and is an independent SCI. The first SCI may also be SCI associated with the current data transmission, and the first SCI includes a time interval between the current data transmission and the next data transmission.

In some embodiments of the present disclosure, a specific format of the first SCI is not specifically limited. In addition, the first SCI includes an information field. The information field is used to indicate the first time interval. When the first SCI is not associated with any data transmission, a signaling format of the first SCI may be the same as or different from a signaling format of third SCI associated with data transmission. When the signaling format of the first SCI is different from the signaling format of the third SCI, the first SCI and the third SCI include different information fields and/or have different bit lengths.

When the first SCI is associated with the first data transmission, the sending end sends the first SCI and first data to the receiving end. The first SCI contains an information field, and the information field also includes some information necessary for the receiving end to correctly receive the first data, such as an address or an ID (Identification) of the receiving end, a modulation and encoding mode, a control information format, a resource identifier, etc. In addition, when the first SCI is associated with the first data transmission, the sending end sends the first SCI on a third time-frequency resource through PSCCH (Pysical Sidelink Control Channel, a bypass control channel), and sends the first data on a fourth time-frequency resource through PSSCH (Pysical Sidelink Share Channel, a bypass data channel).

When the first SCI is not associated with any data transmission and is an independent SCI, the sending end only sends the first SCI on the third time-frequency resource through the PSCCH. In addition, the sending end also sends the first data and the third SCI associated with the first data transmission to the receiving end. The sending end can send the third SCI on a fifth time-frequency resource through the PSCCH, and send the first data on a fourth time-frequency resource through the PSSCH.

The time order of sending the first SCI by the sending end and sending the third SCI and the first data by the sending end may be set and changed as needed. In some embodiments of the present disclosure, this is not specifically limited. For example, the sending end may send the first SCI first, and then send the third SCI and the first data. Alternatively, the sending end may send the third SCI and the first data first, and then send the first SCI. Alternatively, the sending end may send the first SCI, the third SCI and the first data at the same time.

Figure 3:
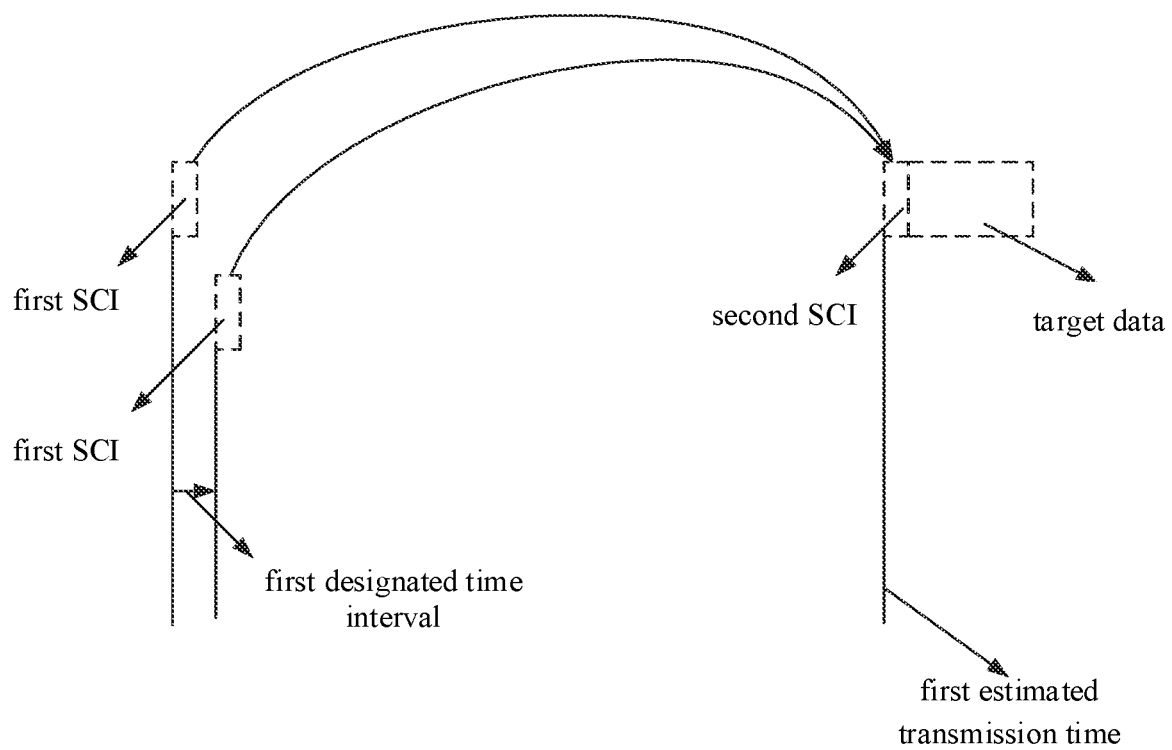
FIG. 3 is a schematic diagram of sending a first SCI for multiple times according to an embodiment of the present disclosure.

In addition, the sending end may send the first SCI to the receiving end multiple times, thereby ensuring relative high reception reliability of the receiving end. In some embodiments of the present disclosure, the number of times the sending end sends the first SCI is not specifically limited. As illustrated in FIG. 3, for example, the number of times may be a designated number of times, and the designated number of times may be that the first SCI is sent to the receiving end every first designated time interval.

There may be one or more receiving ends. When there are multiple receiving ends, the sending end may send the first SCI to the receiving ends in a multicast transmission mode. When there is one receiving end, the sending end may send the first SCI to the receiving end through a unicast transmission mode.

It should be noted that, the first SCI includes at least the first time interval between different transmissions, and may also include a first resource identifier of a first time-frequency resource used for feeding back first NACK information, so that the sending end may indicate, in the first SCI of the predetermined target data transmission, a time-frequency resource for feeding back the NACK information when the SCI fails to be received.

At block S205, the receiving end receives the first SCI sent by the sending end.

At block S206, the receiving end determines the first estimated transmission time of the target data based on the first time interval.

This action may be implemented by following actions (1) and (2).

(1) The receiving end determines first transmission time. The first transmission time may be transmission time of the first SCI or transmission time of a first data transmission associated with the first SCI.

The first transmission time may be transmission start time of the first SCI, transmission end time of the first SCI, or start time of a time cell to which the first SCI transmission belongs. Alternatively, the first transmission time may be transmission start time of the first data, the transmission end time of the first data, or start time of a time cell to which the transmission belongs. In some embodiments of the present disclosure, the first transmission time is not specifically limited.

It should be noted that, when the first SCI is associated with the first data transmission, the first transmission time may be the transmission time of the first SCI or the transmission time of the first data. When the first SCI is not associated with any data transmission, the first transmission time is the transmission time of the first SCI.

For example, when the first SCI is associated with the first data transmission, and the first transmission time is the transmission start time of the first data, in a possible implementation manner, the receiving end determines the transmission start time of the first data based on the third time-frequency resource for transmitting the first data, and determines the transmission start time of the first data as the first transmission time of the first data.

When the first SCI is associated with the first data transmission, and the first transmission time is the transmission end time of the first SCI, in a possible implementation manner, the receiving end determines the transmission end time of the first SCI according to the third time-frequency resource for transmitting the first SCI, and determines the transmission end time as the first transmission time of the first SCI.

When the first SCI is not associated with any data transmission, and the first transmission time is the start time of the time cell to which the transmission of the first SCI belongs, in a possible implementation manner, the receiving end determines the start time of the time cell to which the transmission of the first SCI belongs according to the third time frequency resource for transmitting the first SCI, and determines the start time of the time cell to which the transmission belongs as the first transmission time of the first SCI.

(2) The receiving end determines the first estimated transmission time of the target data based on the first time interval and the first transmission time.

Figure 4:
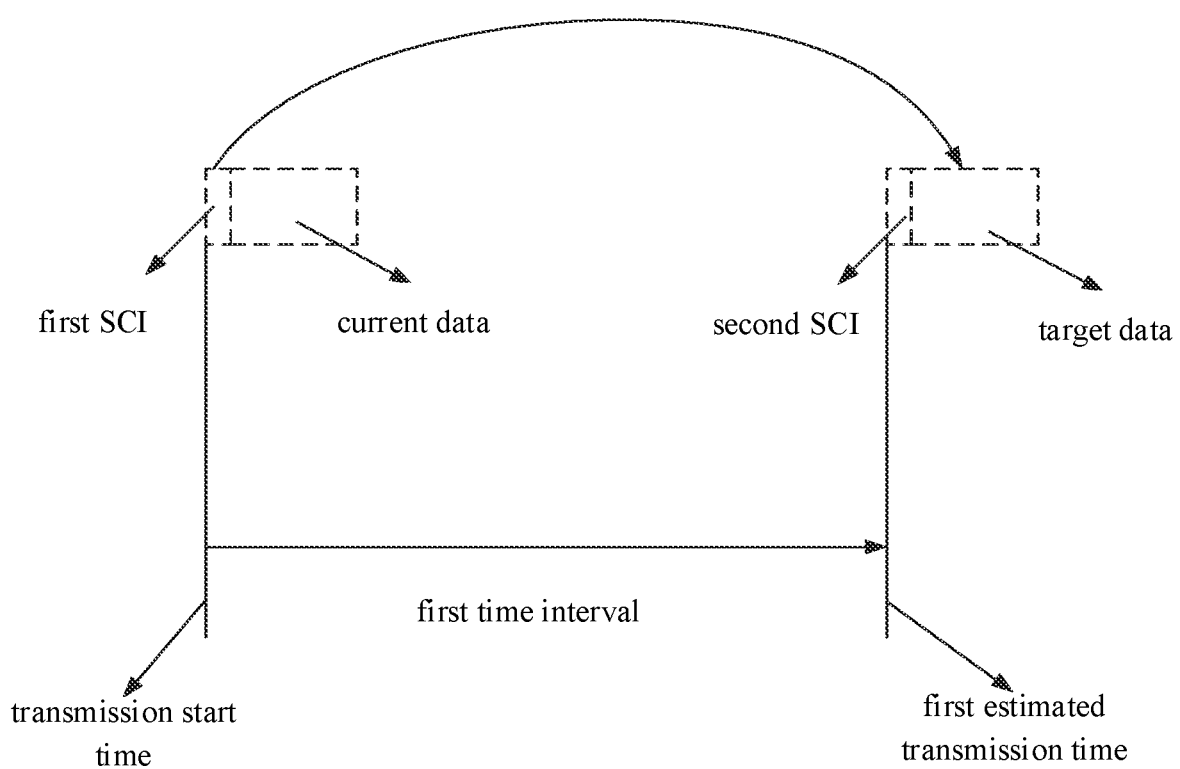
FIG. 4 is a schematic diagram of determining first estimated transmission time according to an embodiment of the present disclosure.

In a possible implementation, when the first transmission time is the transmission start time of the first SCI associated with the first data transmission, the receiving end uses transmission time, which is after the transmission start time and has a distance of the first time interval from the transmission start time, as the first estimated transmission time, as illustrated in FIG. 4. For example, if the transmission start time is the $n^{th}$ slot, and the first time interval is 100 slots, the first estimated transmission time is the $(n+100)^{th}$ slot.

In another possible implementation manner, when the first transmission time is the transmission end time of the first data, the receiving end uses transmission time, which is after the transmission end time and has a distance of the first time interval from the transmission end time, as the first estimated transmission time of a next transmission cycle.

In another possible implementation, when the first transmission time is the start time of a time cell to which the transmission of the first SCI not associated with any data transmission belongs, the receiving end uses transmission time, which is after the start time and has a distance of the first time interval from the start time, as the first estimated transmission time of a next transmission cycle.

It should be noted that, in this step, the receiving end may determine the first transmission time through any of the above implementation manners, and determine the first estimated transmission time according to the first transmission time and the first time interval.

At block S207, the sending end sends the target data and second SCI associated with transmission of the target data to the receiving end.

In this step, after the end of current data transmission, the target data and the second SCI may be sent to the receiving end in the next data transmission adjacent to the currently data transmission. Alternatively, after the end of current data transmission, the target data and the second SCI may be sent to the receiving end in a data transmission not adjacent to the current data transmission, there are n data transmission between the current data transmission and the data transmission not adjacent to the current data transmission, where n is an integer $\geq 2$. In some embodiments of the present disclosure, this is not specifically limited.

When sending the target data and the second SCI to the receiving end in the next data transmission which is after and adjacent to the current data transmission, in order to facilitate distinction, the current data transmission is called a first transmission, the next data transmission is called a second transmission, and a data transmission after and adjacent to the next data transmission is called a third transmission. At the same time, the target data may be called the second data, and data transmitted in the third transmission may be called the third data.

When the first transmission is ended and the second transmission is reached, the sending end sends the second SCI on a sixth time-frequency resource during the second transmission through the PSCCH, and sends the second data on a seventh time-frequency resource through the PSSCH.

When the first SCI is associated with the first data transmission, the sending end sends the second SCI and the second data to the receiving end. The second SCI includes a fourth time interval between different transmissions. The receiving end determines estimated transmission time of the third data in the third transmission according to the fourth time interval.

When the first SCI is not associated with any data transmission and is an independent SCI, in addition to sending the second SCI and the second data to the receiving end, the sending end also sends fourth SCI to the receiving end. The fourth SCI, the same as the first SCI, is not associated with any data transmission. The fourth SCI includes a fourth time interval between different transmissions.

The fourth time interval and the first time interval may be the same or different, which is not specifically limited in the embodiments of the present disclosure.

At block S208, the receiving end receives the target data and the second SCI associated with the transmission of the target data based on the first estimated transmission time.

When the first estimated transmission time is reached, the receiving end receives the target data and the second SCI associated with the target data transmission. For example, the first estimated transmission time is the $(n+100)^{th}$ slot, then, the receiving end receives the target data and the second SCI at the $(n+100)^{th}$ slot.

At block S209, the receiving end feeds back NACK information to the sending end when the receiving end fails to receive the second SCI or fails to correctly receive the target data based on the first estimated transmission time.

When the first estimated transmission time is reached, no information is fed back when the receiving end receives the second SCI and correctly receives the target data. When the receiving end does not receive the second SCI or the target data are not correctly received based on the first estimated transmission time, the NACK information is fed back to the sending end. The NACK information is first NACK information or second NACK information. The first NACK information is used to indicate that the receiving end has not received the second SCI. The second NACK information is used to indicate that the receiving end has received the second SCI but does not correctly receive the target data. Correspondingly, the step for the receiving end to feed back the NACK information to the sending end may be as follows.

When the receiving end does not receive the second SCI based on the first estimated transmission time, the first NACK information is fed back to the sending end through the first time-frequency resource. The first NACK information is used to indicate that the receiving end fails to receive the second SCI. When the receiving end receives the second SCI but does not correctly receive the target data based on the first estimated transmission time, the second NACK information is fed back to the sending end through the second time-frequency resource. The second NACK information is used to indicate that the receiving end receives the second SCI but does not correctly receive the target data.

It should be noted that, before the receiving end feeds back the first NACK information to the sending end through the first time-frequency resource, the receiving end determines the first time-frequency resource used for feeding back the first NACK information. The receiving end may determine the first time-frequency resource through any of the following implementation manners.

The first implementation manner may be as follows. The information field of the first SCI also includes a designated resource interval. The designated resource interval is used to indicate a time interval between the first time-frequency resource and the first estimated transmission time. The receiving end determines the first time-frequency resource according to the designated resource interval and a third resource identifier. Correspondingly, the step for the receiving end to determine the first time-frequency resource may be as follows. After receiving the first SCI, the receiving end may determine a frequency domain position according to the first estimated transmission time and a third designated time interval. The frequency domain position is after the first estimated transmission time and has a distance of the third designated time interval from the first estimated transmission time. And then, the receiving end may determine a time-frequency resource corresponding to the frequency domain position as the first time-frequency resource.

The second implementation manner may be as follows. The first resource identifier of the first time-frequency resource is indicated in the information field of the first SCI. A resource identifier may be a frequency domain location. A time-frequency resource set is preconfigured by base station downlink signaling or a user device, and the time-frequency resource set includes multiple time-frequency resources. Correspondingly, the step for the receiving end to determine the first time-frequency resource may be as follows. The first SCI includes a frequency domain position of the first time-frequency resource. After receiving the first SCI, the receiving end selects a time-frequency resource corresponding to the frequency domain position from the time-frequency resource set according to the frequency domain position in the first SCI, and determines the selected time-frequency resource as the first time-frequency resource.

The third implementation manner may be as follows. A third resource identifier of the third time-frequency resource is included in the information field of the first SCI. A resource identifier is a frequency domain position. The receiving end determines the first time-frequency resource based on the third time-frequency resource used by the first SCI and a mapping relationship between the first time-frequency resource and the third time-frequency resource. Correspondingly, this step may be as follows. After receiving the first SCI, the receiving end determines the third time-frequency resource used by the first SCI, and determines the first time-frequency resource from the mapping relationship between the first time-frequency resource and the third time-frequency resource according to the third time-frequency resource.

The mapping relationship may be m frequency domain positions spaced between the first time-frequency resource and the third time-frequency resource, and m is an integer $\geq 0$. When m is 0, the first time-frequency resource and the third time-frequency resource are the same. When m is not 0, the first time-frequency resource and the third time-frequency resource are different. For example, m is 2, then there are two frequency domain positions separated between the first time-frequency resource and the third time-frequency resource. After receiving the first SCI, the receiving end determines the first time-frequency resource according to the third time-frequency resource used by the first SCI and the two frequency domain positions. The mapping relationship is configured by the base station or the sending end.

It should be noted that, the first time-frequency resource and the second time-frequency resource may be the same or different. For example, in some embodiments of the present disclosure, the first time-frequency resource and the second time-frequency resource are different. The receiving end uses different time-frequency resources to feed back different NACK information, which can help the sending end distinguish whether the receiving end fails to receive the second SCI or the receiving end does not correctly receive the target data, and different adjustments may be performed during retransmission.

The manner in which the receiving end determines the second time-frequency resource and the manner in which the receiving end determines the first time-frequency resource may be the same or different. In some embodiments of the present disclosure, the manner of determining the second time-frequency resource is not specifically limited. For example, the receiving end may determine the first time-frequency resource through the first implementation manner, and determine the second time-frequency resource through the second implementation manner. Alternatively, the receiving end may determine the first time-frequency resource through the second implementation manner, and determine the second time-frequency resource through the first implementation manner.

At block S210, the sending end retransmits the target data when receiving the NACK information fed back by the receiving end.

When the sending end receives the first NACK information or the second NACK information fed back by the receiving end, it is determined that the receiving end does not correctly receive the target data, thus the sending end retransmits the target data.

When receiving the first NACK information fed back by the receiving end on the first time-frequency resource, the sending end determines that the receiving end fails to receive the second SCI. The sending end modifies a control information format of the second SCI to obtain third SCI, and retransmits the target data and the third SCI to the receiving end.

The first NACK information is used to indicate that the receiving end fails to receive the second SCI. The sending end may modify the control information format of the second SCI according to the first NACK information to obtain fifth SCI. Compared to the second SCI, the fifth SCI uses less number of bits. The sending end resends the target data and the fifth SCI with the modified control information format to the receiving end.

When receiving the second NACK information fed back by the receiving end on the second time-frequency resource, the sending end determines that the receiving end does not correctly receive the target data. The sending end modifies a modulation and encoding format of the target data, and resends sixth SCI and target data with the modified modulation and encoding format to the receiving end. The sixth SCI and the second SCI are different, but the control information formats of them are the same.

The second NACK information is used to indicate that the receiving end receives the second SCI but does not correctly receive the target data. The sending end modifies an encoding format of the target data according to the second NACK information to obtain modified target data. The modified target data uses a lower modulation and encoding manner than the original target data.

Embodiments of the present disclosure provide a communication feedback method. The sending end sends the first SCI to the receiving end, the first SCI including the time indication information. After receiving the first SCI, the receiving end determines the estimated transmission time information of the target data based on the time indication information. The receiving end receives the target data and the second SCI associated with the transmission of the target data based on the estimated transmission time information. When the second SCI is not received based on the estimated transmission time information or when the target data are not correctly received, the NACK information is fed back to the sending end. After receiving the NACK information, the sending end retransmits the target data to the receiving end, thus avoiding the loss of the target data in the transmission process, and improving the reliability of transmitting the target data.

Figure 5:
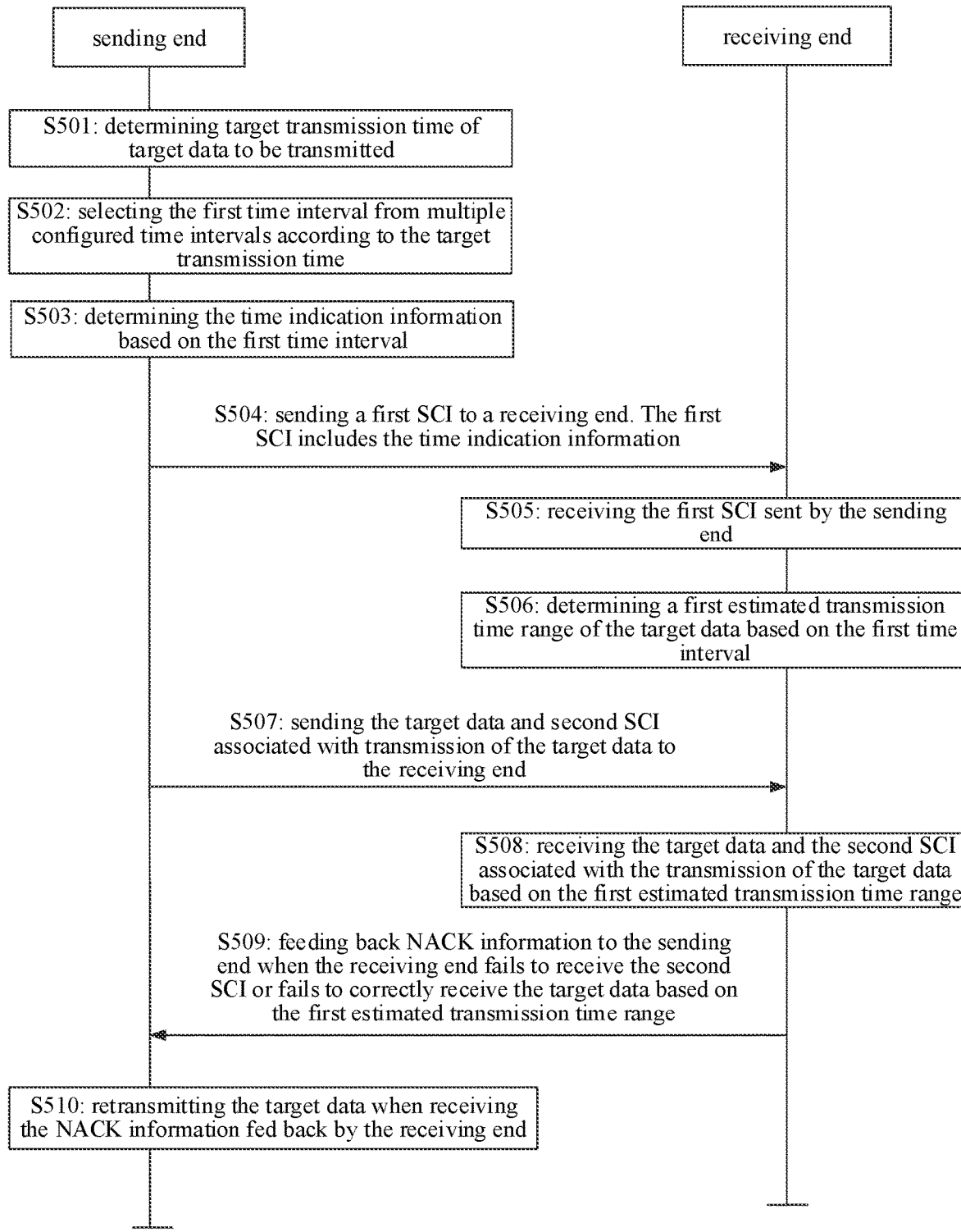
FIG. 5 is a flow chart showing a communication feedback method according to an embodiment of the present disclosure.

Embodiments of the present disclosure provide a communication feedback method. As illustrated in FIG. 5, for example, in this embodiment, the time indication information is a first time interval between different transmissions, and the estimated transmission time information is a first estimated transmission time range, and the method includes the following.

At block S501, a sending end determines target transmission time of target data to be transmitted.

At block S502, the sending end selects the first time interval from multiple configured time intervals according to the target transmission time.

At block S503, the sending end determines the time indication information based on the first time interval.

At block S504, the sending end sends a first SCI to a receiving end. The first SCI includes the time indication information.

At block S505, the receiving end receives the first SCI sent by the sending end.

The actions at blocks S501 to S505 are the same as the actions at blocks S201 to S205, which is not repeated here.

At block S506, the receiving end determines a first estimated transmission time range of the target data based on the first time interval.

This action may be implemented by following actions (1) to (3).

(1): The receiving end determines first transmission time. The first transmission time may be transmission time of the first SCI or transmission time of a first data transmission associated with the first SCI.

This action is the same as the action (1) in the step at block S206, which is not repeated here.

(2): The receiving end determines the first estimated transmission time of the target data based on the first time interval and the first transmission time.

This action is the same as the action (2) in the step at block S206, which is not repeated here.

(3): The receiving end determines the first estimated transmission time range centered on the first estimated transmission time.

The receiving end can determine the first estimated transmission time range through any of the following implementation manners.

In a first implementation manner, the receiving end obtains a transmission time range by taking the first estimated transmission time as the center, with a second designated time interval on both left and right of the center. The receiving end determines the transmission time range as the first estimated transmission time range. For example, if the first estimated transmission time is t and the second designated time interval is T1, the first estimated transmission time range is [t−T1, t+T1]. For example, if t is the $n^{th}$ slot, and the second designated time interval is 20 slots, the first estimated transmission time range is slot [n−20, n+20].

In a second implementation manner, the receiving end obtains a transmission time range by taking the first estimated transmission time as the center, with a third designated time interval on the left of the center and a fourth designated time interval on the right of the center. The receiving end determines the transmission time range as the first estimated transmission time range. For example, if the first estimated transmission time is t, the third designated time interval is T2, and the fourth designated time interval is T3, the first estimated transmission time range is [t−T2, t+T3]. For example, if t is the $n^{th}$ slot, the third designated time interval is 10 slots, and the fourth designated time interval is 30 slots, the first estimated transmission time range is slot [n−10, n+30].

The sizes of the second designated time interval, the third designated time interval, and the fourth designated time interval can be set and changed as required, and in some embodiments of the present disclosure, it is not specifically limited here.

At block S507, the sending end sends the target data and second SCI associated with transmission of the target data to the receiving end.

This action is the same as the action at block S207, which is not repeated here.

At block S508, the receiving end receives the target data and the second SCI associated with the transmission of the target data based on the first estimated transmission time range.

Within the first estimated transmission time range, the receiving end receives the target data and the second SCI associated with the target data transmission. For example, if the first estimated transmission time range is slot [n−10, n+30], the receiving end receives the target data and the second SCI within the time range of slot [n−10, n+30].

At block S509, the receiving end feeds back NACK information to the sending end when the receiving end fails to receive the second SCI or fails to correctly receive the target data based on the first estimated transmission time range.

Within the first estimated transmission time range, the receiving end does not feed back any information when the second SCI is received by the receiving end and the target data are correctly received. Within the first estimated transmission time range, the receiving end feeds back the NACK information to the sending end when the receiving end does not receive the second SCI or the target data are not correctly received. In this step, the step of feeding back the NACK information to the sending end by the receiving end is the same as the step of feeding back the NACK information to the sending end by the receiving end in step S209, and will not be repeated here.

At block S510, the sending end retransmits the target data when receiving the NACK information fed back by the receiving end.

This action is the same as the action at block S210, which is not repeated here.

Embodiments of the present disclosure provide a communication feedback method. The sending end sends the first SCI to the receiving end, the first SCI including the time indication information. After receiving the first SCI, the receiving end determines the estimated transmission time information of the target data based on the time indication information. The receiving end receives the target data and the second SCI associated with the transmission of the target data based on the estimated transmission time information. When the second SCI is not received based on the estimated transmission time information or when the target data are not correctly received, the NACK information is fed back to the sending end. After receiving the NACK information, the sending end retransmits the target data to the receiving end, avoiding the loss of the target data in the transmission process, and improving the reliability of transmitting the target data.

Figure 6:
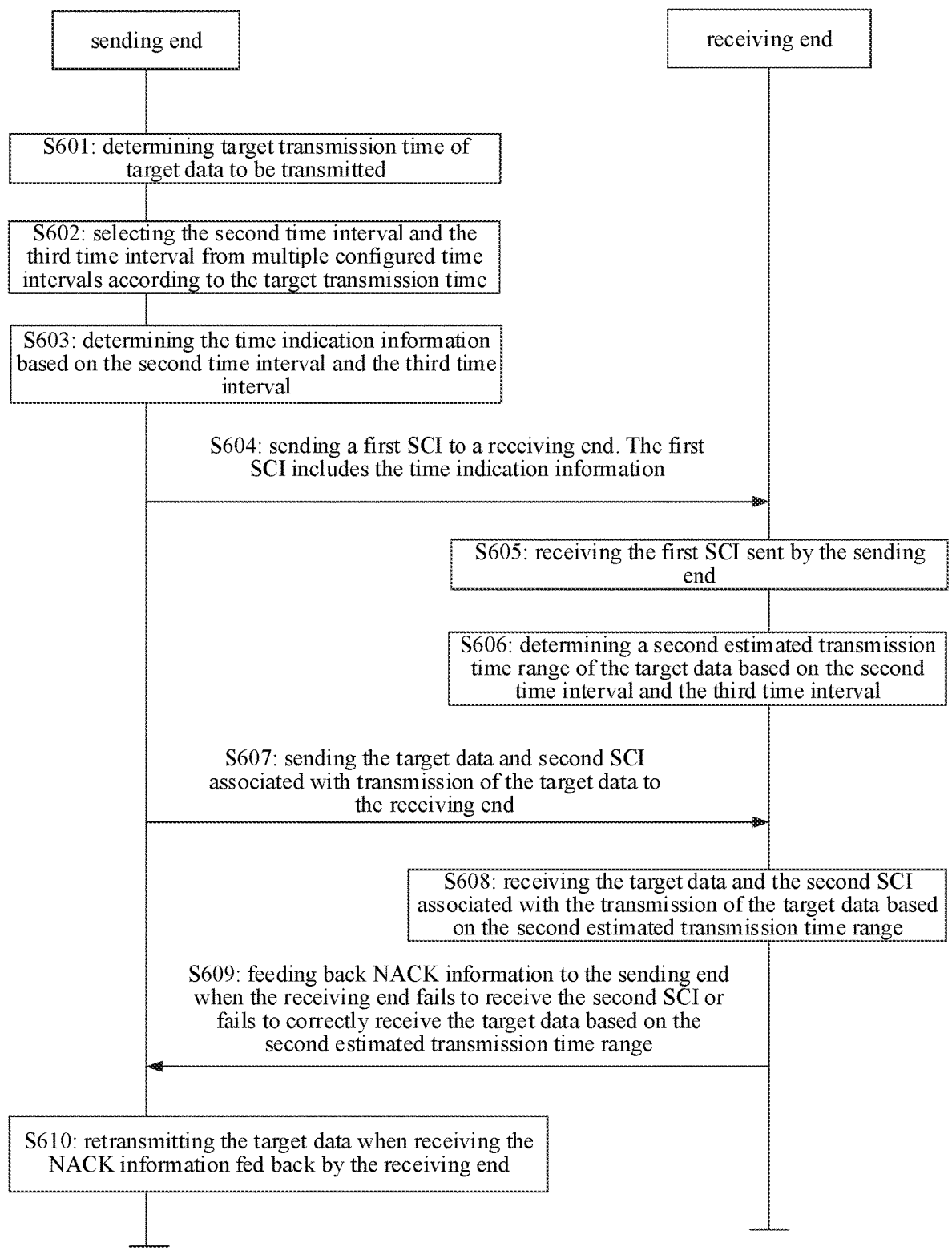
FIG. 6 is a flow chart showing a communication feedback method according to an embodiment of the present disclosure.

Embodiments of the present disclosure provide a communication feedback method. As illustrated in FIG. 6, for example, in this embodiment, the time indication information is a second time interval and a third time interval, and the estimated transmission time information is a second estimated transmission time range, and the method includes the following.

At block S601, a sending end determines target transmission time of target data to be transmitted.

This action is the same as the action at block S201, which is not repeated here.

At block S602, the sending end selects the second time interval and the third time interval from multiple configured time intervals according to the target transmission time.

The sending end configures multiple time intervals in advance. In this step, the sending end selects a minimum time interval and a maximum time interval between different transmissions from the multiple configured time intervals. The minimum time interval is determined as the second time interval, and the maximum time interval is determined as the third time interval.

The sending end determines the transmission time of the first SCI, determines a transmission time difference between the target transmission time and the transmission time of the first SCI, and then selects two time intervals closest to the transmission time difference from the multiple time intervals according to the transmission time difference The two time intervals are the minimum time interval and the maximum time interval respectively. The minimum time interval is determined as the second time interval, and the maximum time interval is determined as the third time interval.

For example, the sending end pre-configures 5 time intervals, and the 5 time intervals are respectively 100 milliseconds, 200 milliseconds, 300 milliseconds, 400 milliseconds, and 500 milliseconds. After the sending end predicts that the target data transmission time is 320 milliseconds, the sending end can set the minimum time interval to 300 milliseconds, that is, the second time interval is 300 milliseconds, and set the maximum time interval to 400 milliseconds, that is, the third time interval is 400 milliseconds.

In this step, the process of pre-configuring the multiple time intervals by the sending end is the same as the process of pre-configuring the multiple time intervals by the sending end in step S202, and will not be repeated here.

At block S603, the sending end determines the time indication information based on the second time interval and the third time interval.

In this step, the sending end adds the determined the second time interval and the third time interval into the time indication information.

At block S604, the sending end sends a first SCI to a receiving end. The first SCI includes the time indication information.

In this step, the time indication information included in the first SCI sent by the sending end is the second time interval and the third time interval. Other steps are the same as the action at block S204, which is not repeated here.

At block S605, the receiving end receives the first SCI sent by the sending end.

The action at block S605 is the same as the action at block S205, which is not repeated here.

At block S606, the receiving end determines a second estimated transmission time range of the target data based on the second time interval and the third time interval.

This action may be implemented by following actions (1) to (3).

(1): The receiving end determines first transmission time. The first transmission time may be transmission time of the first SCI or transmission time of a first data transmission associated with the first SCI.

This action is the same as the action (1) in the step at block S206, which is not repeated here.

(2): The receiving end determines first transmission start time and first transmission end time of the target data based on the second time interval, the third time interval and the first transmission time.

In a possible implementation, when the first transmission time is the transmission start time of the first SCI that is not associated with any data transmission, the receiving end uses transmission time, which is after the transmission start time and has a distance of the second time interval from the transmission start time, as the first transmission start time, and uses transmission time, which is after the transmission start time and has a distance of the third time interval from the transmission start time, as the first transmission end time. For example, the transmission start time is t, the second time interval is 300 milliseconds, and the third time interval is 400 milliseconds, then the first transmission start time is t+300, and the first transmission end time is t+400.

In another possible implementation, when the first transmission time is the transmission end time of the first data, the receiving end uses transmission time, which is after the transmission end time and has a distance of the second time interval from the transmission end time, as the first transmission start time, and uses transmission time, which is after the transmission end time and has a distance of the third time interval from the transmission end time, as the first transmission end time.

In another possible implementation, when the first transmission time is the start time of a time cell to which the transmission of the first SCI associated with the first data transmission belongs, the receiving end uses transmission time, which is after the start time and has a distance of the second time interval from the start time, as the first transmission start time, and uses transmission time, which is after the start time and has a distance of the third time interval from the start time, as the first transmission end time.

(3): The receiving end determines the second estimated transmission time range based on the first transmission start time and the first transmission end time.

Figure 7:
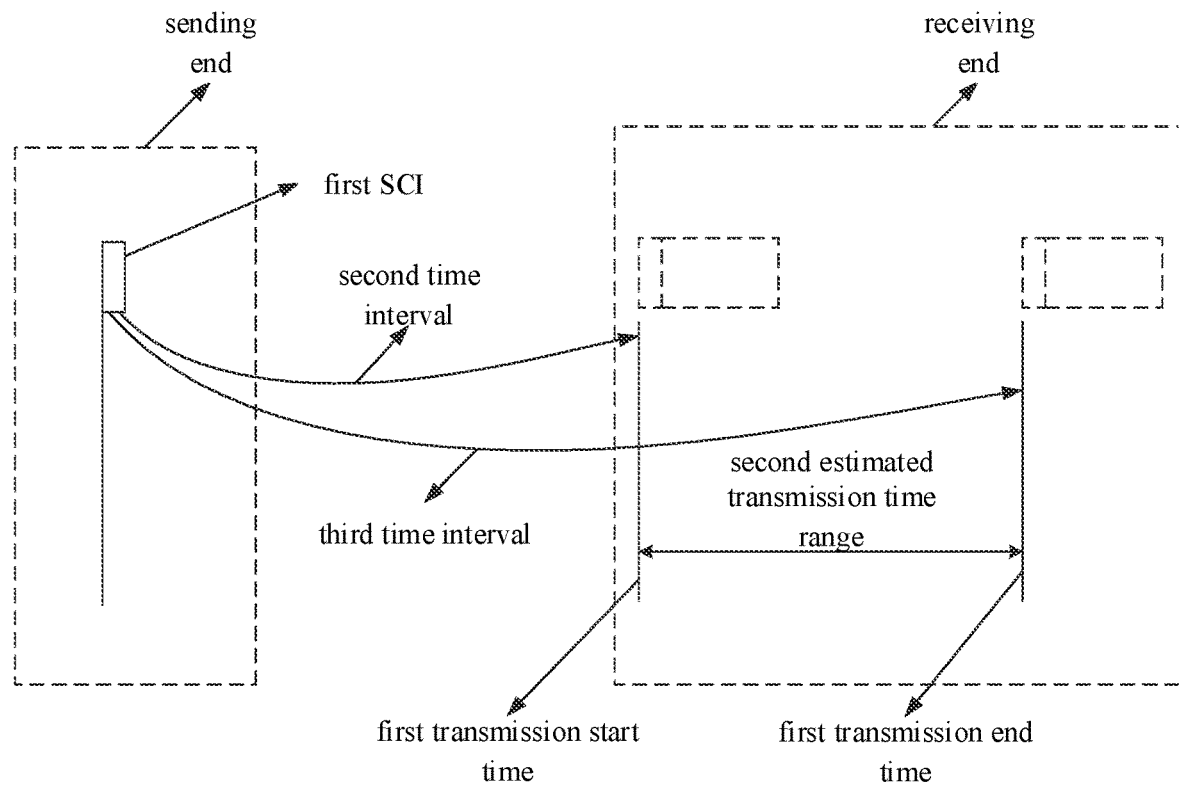
FIG. 7 is a schematic diagram of determining a second estimated transmission time range according to an embodiment of the present disclosure.

The receiving end determines a time range between the first transmission start time and the first transmission end time as the second estimated transmission time range, as illustrated in FIG. 7. For example, the first transmission start time is t+300 milliseconds, and the first transmission end time is t+500 milliseconds, then the second estimated transmission time range is [t+300, t+500].

At block S607, the sending end sends the target data and second SCI associated with transmission of the target data to the receiving end.

This action is the same as the action at block S207, which is not repeated here.

At block S608, the receiving end receives the target data and the second SCI associated with the transmission of the target data based on the second estimated transmission time range.

The receiving end receives the target data and the second SCI associated with the target data transmission within the second estimated transmission time range. For example, the second estimated transmission time range is [t+300, t+500], then the receiving end receives the target data and the second SCI within the time range of [t+300, t+500].

At block S609, the receiving end feeds back NACK information to the sending end when the receiving end fails to receive the second SCI or fails to correctly receive the target data based on the second estimated transmission time range.

Within the second estimated transmission time range, the receiving end does not feed back any information when the second SCI is received by the receiving end and the target data are correctly received. Within the second estimated transmission time range, the receiving end feeds back the NACK information to the sending end when the receiving end does not receive the second SCI or the target data are not correctly received. In this step, the step of feeding back the NACK information to the sending end by the receiving end is the same as the step of feeding back the NACK information to the sending end by the receiving end in step S209, and will not be repeated here.

It should be noted that, when the receiving end determines the first time-frequency resource in this embodiment, the first time-frequency resource may be determined based on the first transmission start time of the second estimated transmission time range, or based on the first transmission end time of the second estimated transmission time range. In some embodiments of the present disclosure, this is not specifically limited. The manner in which the receiving end determines the first time-frequency resource based on the first transmission start time or the first transmission end time is similar to the manner of determining the first time-frequency resource in step S209, and will not be repeated here.

At block S610, the sending end retransmits the target data when receiving the NACK information fed back by the receiving end.

This action is the same as the action at block S210, which is not repeated here.

Embodiments of the present disclosure provide a communication feedback method. The sending end sends the first SCI to the receiving end, the first SCI including the time indication information. After receiving the first SCI, the receiving end determines the estimated transmission time information of the target data based on the time indication information. The receiving end receives the target data and the second SCI associated with the transmission of the target data based on the estimated transmission time information. When the second SCI is not received based on the estimated transmission time information or when the target data are not correctly received, the NACK information is fed back to the sending end. After receiving the NACK information, the sending end retransmits the target data to the receiving end, avoiding the loss of the target data in the transmission process, and improving the reliability of transmitting the target data.

Figure 8:
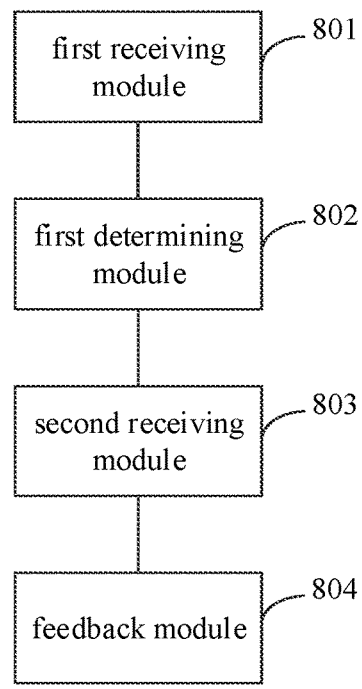
FIG. 8 a block diagram of a communication feedback apparatus according to an embodiment of the present disclosure.

Embodiments of the present disclosure provide a communication feedback apparatus. As illustrated in FIG. 8, the apparatus includes a first receiving module 801, a first determining module 802, a second receiving module 803, and a feedback module 804.

The first receiving module 801 is configured to receive first sidelink control information (SCI) sent by a sending end. The first SCI contains time indication information.

The first determining module 802 is configured to determine estimated transmission time information of target data based on the time indication information.

The second receiving module 803 is configured to receive the target data and second SCI associated with transmission of the target data based on the estimated transmission time information.

The feedback module 804 is configured to feed back non-acknowledgment (NACK) information to the sending end in response to failing to receive the second SCI or failing to correctly receive the target data based on the estimated transmission time information.

In a possible implementation, the time indication information includes a first time interval between different transmissions, and the estimated transmission time information includes first estimated transmission time.

The first determining module 802 is further configured to: determine first transmission time, the first transmission time including transmission time of the first SCI or transmission time of a first data transmission associated with the first SCI; and determine the first estimated transmission time of the target data based on the first time interval and the first transmission time.

In another possible implementation, the time indication information includes a first time interval between different transmissions, and the estimated transmission time information includes a first estimated transmission time range.

The first determining module 802 is further configured to: determine first transmission time, the first transmission time including transmission time of the first SCI or transmission time of a first data transmission associated with the first SCI; determine first estimated transmission time of the target data based on the first time interval and the first transmission time; and determine the first estimated transmission time range centered on the first estimated transmission time.

In another possible implementation, the time indication information includes a second time interval and a third time interval, the second time interval and the third time interval are a minimum time interval and a maximum time interval between different transmissions respectively, and the estimated transmission time information includes a second estimated transmission time range.

The first determining module 802 is further configured to: determine first transmission time, the first transmission time including transmission time of the first SCI or transmission time of a first data transmission associated with the first SCI; determine first transmission start time and first transmission end time of the target data based on the second time interval, the third time interval and the first transmission time; and determine the second estimated transmission time range based on the first transmission start time and the first transmission end time.

In another possible implementation, the first SCI may be SCI associated with transmission of the first data of the current transmission or SCI not associated with data transmission.

In another possible implementation, the feedback module 804 is further configured to feed back first NACK information to the sending end through a first time-frequency resource when the second SCI is not received based on the estimated transmission time information. The first NACK information is configured to indicate that the second SCI is not received.

The feedback module 804 is further configured to feed back second NACK information to the sending end through a second time-frequency resource when the second is received SCI but the target data are not correctly received based on the estimated transmission time information. The second NACK information is configured to indicate that the second SCI is received but the target data are not correctly received.

In another possible implementation, the first SCI is further configured to indicate a first resource identifier for feeding back the first NACK information. The apparatus further includes a second determining module.

The second determining module is configured to determine the first time-frequency resource corresponding to the first resource identifier.

In another possible implementation, the apparatus further includes a third determining module.

The third determining module is configured to determine a third time-frequency resource used by the first SCI, and determine the first time-frequency resource from a mapping relationship between the third time-frequency resource and the first time-frequency resource based on the third time-frequency resource.

Embodiments of the present disclosure provide a communication feedback apparatus. The sending end sends the first SCI to the receiving end, the first SCI including the time indication information. After receiving the first SCI, the receiving end determines the estimated transmission time information of the target data based on the time indication information. The receiving end receives the target data and the second SCI associated with the transmission of the target data based on the estimated transmission time information. When the second SCI is not received based on the estimated transmission time information or when the target data are not correctly received, the NACK information is fed back to the sending end. After receiving the NACK information, the sending end retransmits the target data to the receiving end, avoiding the loss of the target data in the transmission process, and improving the reliability of transmitting the target data.

Figure 9:
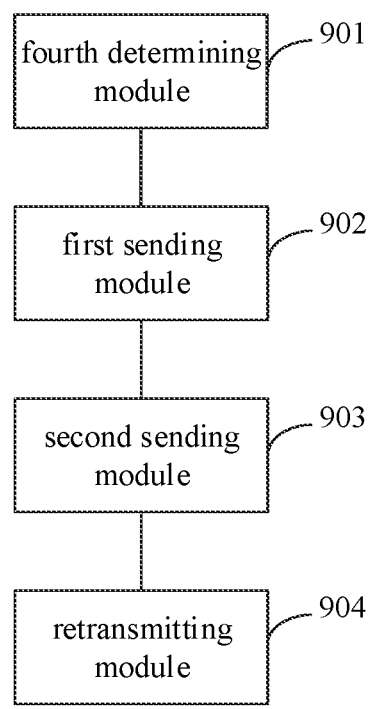
FIG. 9 a block diagram of a communication feedback apparatus according to an embodiment of the present disclosure.

Embodiments of the present disclosure provide a communication feedback apparatus. As illustrated in FIG. 9, the apparatus includes a fourth determining module 901, a first sending module 902, a second sending module 903, and a retransmitting module 904.

The fourth determining module 901 is configured to determine time indication information.

The first sending module 902 is configured to send first sidelink control information (SCI) to a receiving end. The first SCI indicates the time indication information, and the time indication information is configured to indicate target data to be transmitted and estimated transmission time information of second SCI associated with transmission of the target data.

The second sending module 903 is configured to send the target data and the second SCI to the receiving end.

The retransmitting module 904 is configured to retransmit the target data when non-acknowledgment (NACK) information fed back by the receiving end is received.

In a possible implementation, the first sending module 902 is further configured to send the first SCI to the receiving end multiple times.

In another possible implementation, the time indication information may be a first time interval between different transmissions.

The fourth determining module 901 is configured to: determine target transmission time of the target data; select the first time interval from multiple configured time intervals according to the target transmission time; and determine the time indication information based on the first time interval.

In another possible implementation, the time indication information may be a second time interval and a third time interval, and the second time interval and the third time interval are a minimum time interval and a maximum time interval between different transmissions respectively.

The fourth determining module 901 is further configured to: determine target transmission time of the target data; select the second time interval and the third time interval from multiple configured time intervals according to the target transmission time; and determine the time indication information based on the second time interval and the third time interval.

In another possible implementation, the retransmitting module 904 is configured to retransmit the target data to the receiving end when first NACK information fed back by the receiving end is received on a first time-frequency resource or second NACK information fed back by the receiving end is received on a second time-frequency resource. The first NACK information is configured to indicate that the receiving end fails to receive the second SCI. The second NACK information is configured to indicate that the second SCI is received by the receiving end but the target data are not correctly received.

In another possible implementation, the first SCI may be SCI associated with the first data transmission or SCI not associated with data transmission.

In another possible implementation, the first SCI is further configured to indicate a first resource identifier for feeding back the first NACK information.

Embodiments of the present disclosure provide a communication feedback apparatus. The sending end sends the first SCI to the receiving end, the first SCI including the time indication information. After receiving the first SCI, the receiving end determines the estimated transmission time information of the target data based on the time indication information. The receiving end receives the target data and the second SCI associated with the transmission of the target data based on the estimated transmission time information. When the second SCI is not received based on the estimated transmission time information or when the target data are not correctly received, the NACK information is fed back to the sending end. After receiving the NACK information, the sending end retransmits the target data to the receiving end, avoiding the loss of the target data in the transmission process, and improving the reliability of transmitting the target data.

Figure 10:
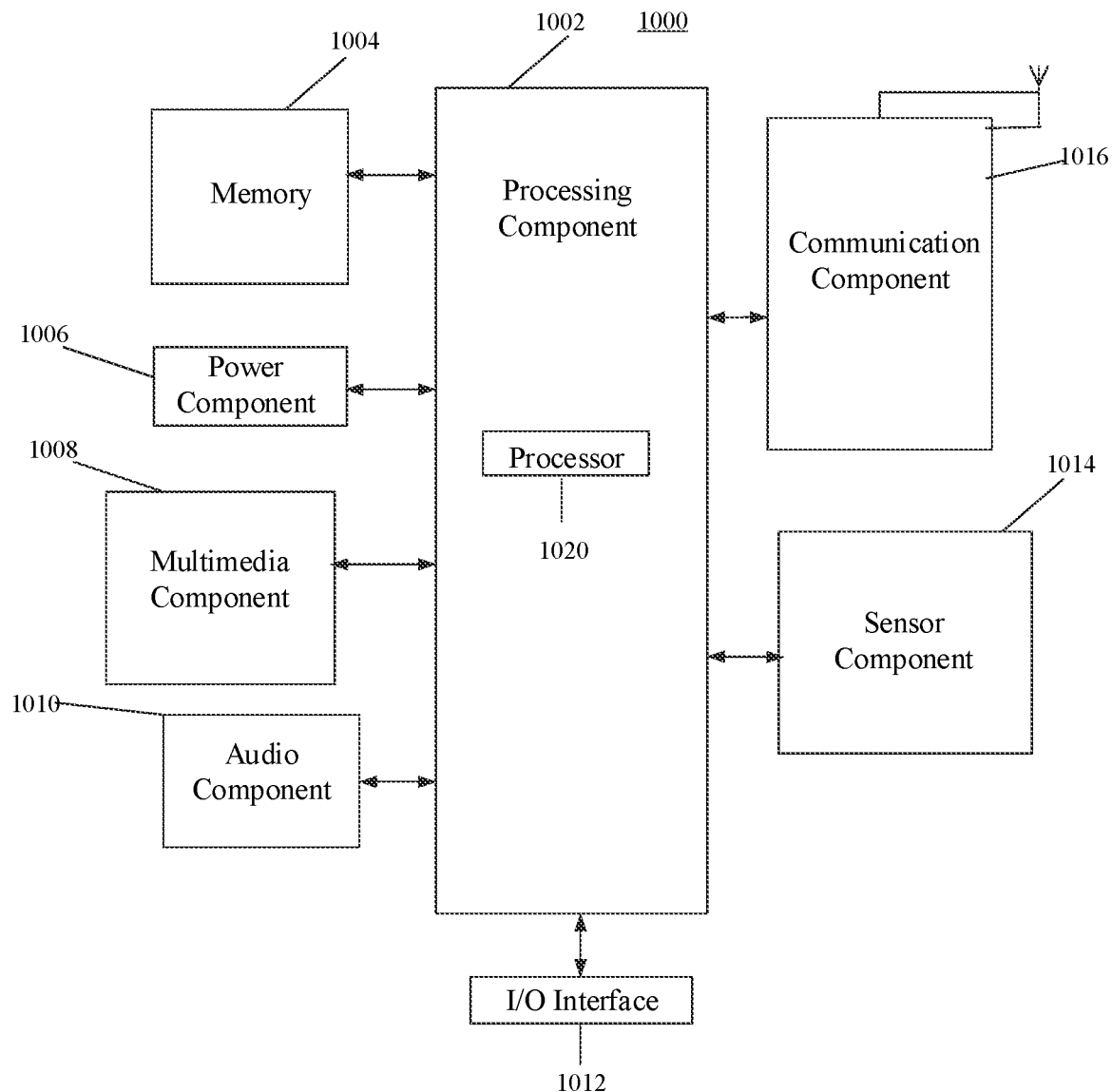
FIG. 10 is a schematic diagram of a user device an embodiment of the present disclosure.

FIG. 10 is a block diagram of a user device 1000 according to an embodiment of the present disclosure. For example, the user device 1000 may be configured to perform the communication feedback provided in the above embodiments. As illustrated in FIG. 10, the user device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the user device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the user device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the user device 1000. The power component 1006 may include a power management system, one or more power sources, and any other components associated with the generation, management, and distribution of power in the user device 1000.

The multimedia component 1008 includes a screen providing an output interface between the user device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the user device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the user device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the user device 1000. For instance, the sensor component 1014 may detect an open/closed status of the user device 1000, relative positioning of components, e.g., the display and the keypad, of the user device 1000, a change in position of the user device 1000 or a component of the user device 1000, a presence or absence of user contact with the user device 1000, an orientation or an acceleration/deceleration of the user device 1000, and a change in temperature of the user device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the user device 1000 and other devices. The user device 1000 can access a wireless network based on a communication standard, such as WiFi, 2G or 3G or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications.

In exemplary embodiments, the user device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1004, executable by the processor 1020 in the user device 1000, for performing the above-described methods. For example, the non-transitory computer-readable storage medium may be a ROM, a RAM, a CD-ROM, a magnetic tape, a floppy disc, an optical data storage device, and the like.

Those skilled in the art shall understand that all or part of the steps in the above embodiments can be implemented by hardware or by instructing related hardware via programs, the program may be stored in a computer readable storage medium. The storage medium mentioned above may be read-only memories, magnetic disks, CD, etc.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A communication feedback method, comprising:
receiving first sidelink control information (SCI) sent by a sending end, wherein the first SCI contains time indication information, wherein the time indication information comprises a first time interval between different transmissions, and the first time interval is a time interval between a transmission time point of the first SCI and a target data transmission time point;
determining estimated transmission time information of target data based on the time indication information;
receiving the target data and second SCI associated with transmission of the target data based on the estimated transmission time information; and
feeding back non-acknowledgment (NACK) information to the sending end in response to failing to receive the second SCI or failing to correctly receive the target data based on the estimated transmission time information.

2. The method of claim 1, wherein the estimated transmission time information comprises first estimated transmission time;
determining the estimated transmission time information of the target data based on the time indication information comprises:
determining first transmission time, wherein the first transmission time comprises transmission time of the first SCI or transmission time of a first data transmission associated with the first SCI; and
determining the first estimated transmission time of the target data based on the first time interval and the first transmission time.

3. The method of claim 1, wherein the estimated transmission time information comprises a first estimated transmission time range;
determining the estimated transmission time information of the target data based on the time indication information comprises:
determining first transmission time, wherein the first transmission time comprises transmission time of the first SCI or transmission time of a first data transmission associated with the first SCI;
determining first estimated transmission time of the target data based on the first time interval and the first transmission time; and
determining the first estimated transmission time range centered on the first estimated transmission time.

4. The method of claim 1, wherein the time indication information comprises a second time interval and a third time interval, the second time interval and the third time interval are a minimum time interval and a maximum time interval between different transmissions respectively, and the estimated transmission time information comprises a second estimated transmission time range;
determining the estimated transmission time information of the target data based on the time indication information comprises:
determining first transmission time, wherein the first transmission time comprises transmission time of the first SCI or transmission time of a first data transmission associated with the first SCI;
determining first transmission start time and first transmission end time of the target data based on the second time interval, the third time interval and the first transmission time; and
determining the second estimated transmission time range based on the first transmission start time and the first transmission end time.

5. The method of claim 1, wherein the first SCI comprises SCI associated with transmission of the first data or SCI not associated with data transmission.

6. The method of claim 1, wherein feeding back the NACK information to the sending end in response to failing to receive the second SCI or failing to correctly receive the target data based on the estimated transmission time information comprises:
in response to failing to receive the second SCI based on the estimated transmission time information, feeding back first NACK information to the sending end through a first time-frequency resource, wherein the first NACK information is configured to indicate that the second SCI is not received; and
in response to receiving the second SCI but failing to correctly receive the target data based on the estimated transmission time information, feeding back second NACK information to the sending end through a second time-frequency resource, wherein the second NACK information is configured to indicate that the second SCI is received but the target data are not correctly received.

7. The method of claim 6, wherein the first SCI is further configured to indicate a first resource identifier for feeding back the first NACK information;
before feeding back the first NACK information to the sending end through the first time-frequency resource, the method further comprises:
determining the first time-frequency resource corresponding to the first resource identifier.

8. The method of claim 6, before feeding back the first NACK information to the sending end through the first time-frequency resource, the method further comprising:
determining a third time-frequency resource used by the first SCI; and
determining the first time-frequency resource from a mapping relationship between the third time-frequency resource and the first time-frequency resource based on the third time-frequency resource.

9. A communication feedback method, comprising:
determining time indication information, wherein the time indication information comprises a first time interval between different transmissions, and the first time interval is a time interval between a transmission time point of the first SCI and a target data transmission time point;
sending first sidelink control information (SCI) to a receiving end, wherein the first SCI indicates the time indication information, and the time indication information is configured to indicate target data to be transmitted and estimated transmission time information of second SCI associated with transmission of the target data;
sending the target data and the second SCI to the receiving end; and
retransmitting the target data in response to receiving non-acknowledgment (NACK) information fed back by the receiving end.

10. The method of claim 9, wherein sending the first SCI to the receiving end comprises:

sending the first SCI to the receiving end multiple times.

11. The method of claim 9, wherein
determining the time indication information comprises:
determining target transmission time of the target data;
selecting the first time interval from a plurality of configured time intervals according to the target transmission time; and
determining the time indication information based on the first time interval.

12. The method of claim 9, wherein the time indication information comprises a second time interval and a third time interval, and the second time interval and the third time interval are a minimum time interval and a maximum time interval between different transmissions respectively;
determining the time indication information comprises:
determining target transmission time of the target data;
selecting the second time interval and the third time interval from a plurality of configured time intervals according to the target transmission time; and
determining the time indication information based on the second time interval and the third time interval.

13. The method of claim 9, wherein retransmitting the target data in response to receiving the NACK information fed back by the receiving end comprises:
in response to receiving first NACK information fed back by the receiving end on a first time-frequency resource or receiving second NACK information fed back by the receiving end on a second time-frequency resource, retransmitting the target data to the receiving end, wherein the first NACK information is configured to indicate that the receiving end fails to receive the second SCI, and the second NACK information is configured to indicate that the second SCI is received by the receiving end but the target data are not correctly received.

14. The method of claim 13, wherein the first SCI is further configured to indicate a first resource identifier for feeding back the first NACK information.

15. The method of claim 9, wherein the first SCI comprises SCI associated with transmission of the first data or SCI not associated with data transmission.

16. A user device, comprising:
a processor; and
a memory for storing instructions executable by the processor;
wherein the processor is configured to:
receive first sidelink control information (SCI) sent by a sending end, wherein the first SCI contains time indication information, wherein the time indication information comprises a first time interval between different transmissions, and the first time interval is a time interval between a transmission time point of the first SCI and a target data transmission time point;
determine estimated transmission time information of target data based on the time indication information;
receive the target data and second SCI associated with transmission of the target data based on the estimated transmission time information; and
feed back non-acknowledgment (NACK) information to the sending end in response to failing to receive the second SCI or failing to correctly receive the target data based on the estimated transmission time information.

17. The user device of claim 16, wherein the estimated transmission time information comprises first estimated transmission time;
the processor is configured to determine the estimated transmission time information of the target data based on the time indication information by:
determining first transmission time, wherein the first transmission time comprises transmission time of the first SCI or transmission time of a first data transmission associated with the first SCI; and
determining the first estimated transmission time of the target data based on the first time interval and the first transmission time.

18. The user device of claim 16, wherein the estimated transmission time information comprises a first estimated transmission time range;
the processor is configured to determine the estimated transmission time information of the target data based on the time indication information by:
determining first transmission time, wherein the first transmission time comprises transmission time of the first SCI or transmission time of a first data transmission associated with the first SCI;
determining first estimated transmission time of the target data based on the first time interval and the first transmission time; and
determining the first estimated transmission time range centered on the first estimated transmission time.

19. The user device of claim 16, wherein the time indication information comprises a second time interval and a third time interval, the second time interval and the third time interval are a minimum time interval and a maximum time interval between different transmissions respectively, and the estimated transmission time information comprises a second estimated transmission time range;
the processor is configured to determine the estimated transmission time information of the target data based on the time indication information by:
determining first transmission time, wherein the first transmission time comprises transmission time of the first SCI or transmission time of a first data transmission associated with the first SCI;
determining first transmission start time and first transmission end time of the target data based on the second time interval, the third time interval and the first transmission time; and
determining the second estimated transmission time range based on the first transmission start time and the first transmission end time.

20. The user device of claim 16, wherein the first SCI comprises SCI associated with transmission of the first data or SCI not associated with data transmission.

* * * * *